United States Patent [19]

Fukasawa

[11] Patent Number: 5,642,387
[45] Date of Patent: Jun. 24, 1997

[54] BIT SYNCHRONIZATION METHOD AND CIRCUIT

[75] Inventor: Akihiko Fukasawa, Tokyo, Japan

[73] Assignee: Oki Electric Industry Co., Ltd., Tokyo, Japan

[21] Appl. No.: 597,512

[22] Filed: Feb. 2, 1996

[30] Foreign Application Priority Data

Feb. 3, 1995 [JP] Japan .................. 7-016739

[51] Int. Cl.$^6$ .............. H04L 7/00; H04L 25/36; H04L 25/40
[52] U.S. Cl. .................. 375/372; 365/189.04
[58] Field of Search .................. 375/372, 371, 375/354; 370/105.3, 108; 365/189.04, 230.08

[56] References Cited

U.S. PATENT DOCUMENTS

| 5,119,406 | 6/1992 | Kramer | 375/372 |
|---|---|---|---|
| 5,247,485 | 9/1993 | Ide | 364/230.01 |
| 5,283,787 | 2/1994 | Fletcher et al. | 375/372 |
| 5,353,313 | 10/1994 | Honea | 375/372 |
| 5,502,750 | 3/1996 | Co et al. | 375/372 |
| 5,563,891 | 10/1996 | Wang | 375/372 |

FOREIGN PATENT DOCUMENTS 2-76332  3/1990  Japan .

OTHER PUBLICATIONS

"A study of bit synchronization circuit for high-speed switching systems" Technical Paper of the IEICE of Japan, SSE89-114, NTT Communication Switching Labs, Otsuka et al., pp. 37-42.

"Bit Synchronization Circuit for High-Speed Switching Systems," Transactions of the IEICE of Japan B-I, vol. J74-B-1, No. 4, pp. 304-312, 1991 Otsuka et al.

Primary Examiner—Stephen Chin
Assistant Examiner—Betsy P. Lee
Attorney, Agent, or Firm—Spencer & Frank

[57] ABSTRACT

A bit synchronization circuit receives a first clock signal, a higher-frequency second clock signal, and digital data synchronized with the first clock signal. From the first clock signal, the circuit generates a write control signal that cyclically selects memory elements from a group of memory elements, and stores the digital data in the selected memory elements. From the second clock signal, the circuit generates a read control signal that cyclically selects memory elements from the same group, and outputs the digital data from the selected memory elements. The circuit also compares the phase of the read and write control signals, and adjusts the phase of the read control signal in response to the phase relation between the write control signal and read control signal.

14 Claims, 13 Drawing Sheets

BIT SYNCHRONIZATION METHOD AND CIRCUIT

BACKGROUND OF THE INVENTION

The present invention relates to a bit synchronization method and circuit that receives digital data synchronized with a first clock signal, and outputs the data in synchronization with a second clock signal that is not synchronized with the first clock signal, the second clock signal having a higher frequency then the first clock signal.

The purpose of a bit synchronization circuit is to synchronize and reshape the incoming signal, and to prevent bit slip by absorbing clock jitter and frequency error. Bit slip refers to the skipping of a bit, or output of the same bit twice. Bit synchronization is particularly necessary in equipment that must process high-speed digital signals, including, for example, various equipment used in broadband integrated services digital networks (B-ISDN equipment). The present invention is useful in, for example, carrier equipment, multiplexing equipment, switching equipment, and in general any equipment that receives digital signals in which the bits are not synchronized with a clock signal employed in the equipment.

The present invention is an improved version of the elastic store method. In the elastic store method, the incoming data signal is routed through a parallel bank of flip-flop circuits (flip-flops). The flip-flops are selected cyclically for both writing input data and reading output data. The write cycle is controlled by the first clock signal. The read cycle is controlled by the second clock signal.

The read and write cycles must be kept out of phase with each other, to avoid access conflicts. If an access conflict occurs (if a flip-flop is written to while being read), the conventional elastic store method takes corrective action by adjusting the phase of the write cycle. Since the write-cycle phase must be synchronized with the first clock signal, in adjusting the phase, the conventional method cannot make use of the higher frequency of the second clock signal. The conventional method has several disadvantages.

One disadvantage is that every adjustment of the phase of the write cycle is accompanied by bit slip.

Another disadvantage is that, depending on the amount of mutual jitter between the first and second clock signals, an excessive number of flip-flops may be needed to reduce the probability of bit slip to an acceptably low level. The attendant large size of the bit synchronization circuit can present problems, particularly in a device that receives many data signals and requires a separate bit synchronization circuit for each signal, or a device that receives a parallel data signal and requires a separate set of flip-flops for each parallel bit of data.

Yet another disadvantage is that, no matter how many flip-flops are provided, bit slip will occur periodically unless the frequency of the second clock signal is an exact integer multiple of the frequency of the first clock signal. In many cases the first and second clock signals are generated by different oscillators, making an exact frequency relationship difficult to maintain.

SUMMARY OF THE INVENTION

It is accordingly an object of the present invention to absorb clock jitter without bit slip.

Another object of the invention is to absorb frequency error without bit slip.

Yet another object is to reduce the size of a bit synchronization circuit.

The invented method of bit synchronization comprises the steps of:

receiving a first clock signal;

receiving a second clock signal having a higher frequency than the first clock signal;

receiving digital data in synchronization with the first clock signal;

generating, from the first clock signal, a write control signal that cyclically selects memory elements in a memory circuit;

storing the received digital data in the memory elements selected by the write control signal;

generating, from the second clock signal, a read control signal that cyclically selects the above memory elements;

outputting the digital data stored in the memory elements selected by the read control signal, in synchronization with the second clock signal;

comparing the phase of the write control signal and read control signal; and adjusting the phase of the read control signal responsive to the phase relation between the write control signal and the read control signal.

DETAILED DESCRIPTION OF THE INVENTION

Specific embodiments of the invention will be described with reference to the attached illustrative drawings, but first the general principle of the invention will be schematically illustrated and described.

Figure 1:
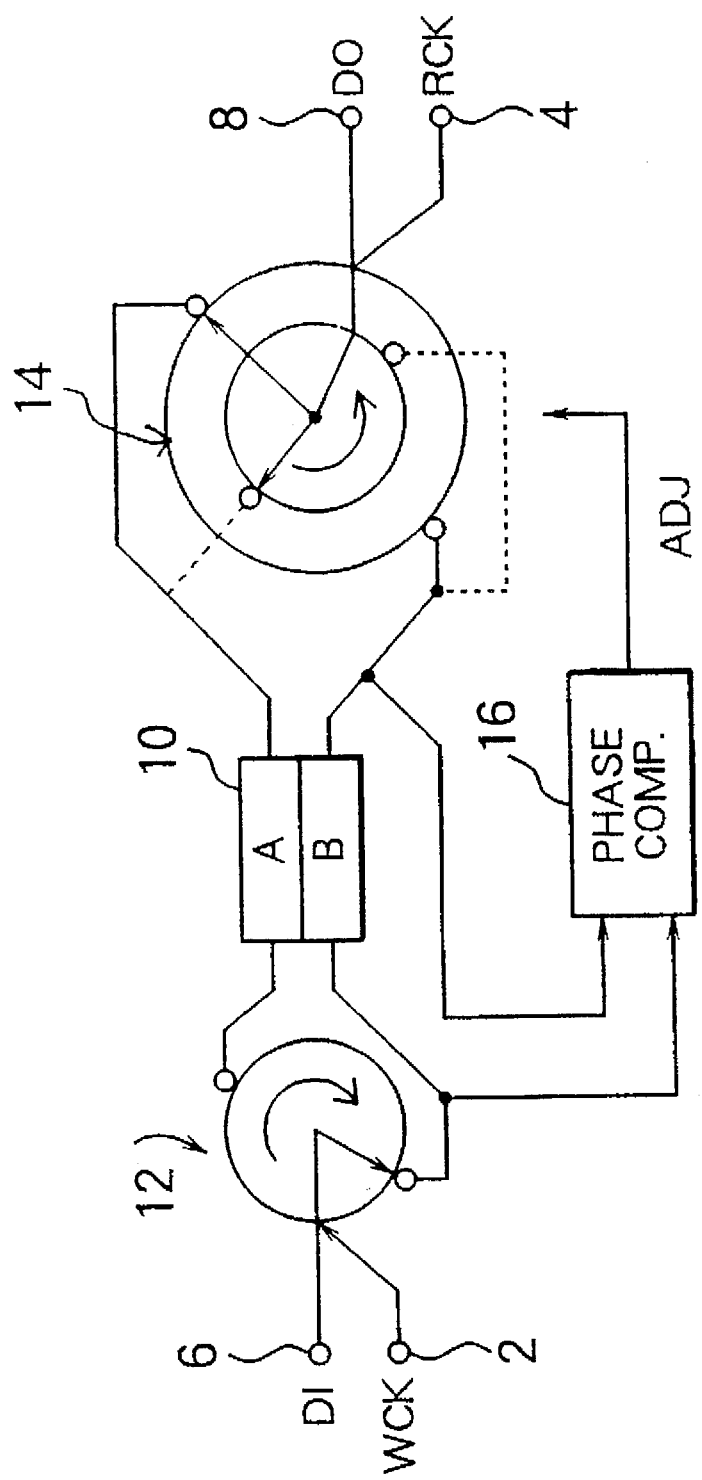
FIG. 1 is a schematic diagram illustrating the general principle and configuration of the present invention.

Referring to FIG. 1, the invented bit synchronization circuit has a first clock terminal 2 for receiving a first clock signal WCK, and a second clock terminal 4 for receiving a second clock signal RCK. The first clock signal WCK has a certain frequency fw. The second clock signal RCK has a second and higher frequency fr. The ratio between the two frequencies will be denoted by the letter N, that is, fr=N×fw.

The first and second clock signals WCK and RCK are not mutually synchronized.

The value of N must be greater than one. In FIG. 1, N is equal to two.

The bit synchronization circuit also has a data input terminal 6 for receiving digital data synchronized with WCK, and a data output terminal 8 for output of the same digital data in synchronization with RCK. Synchronization means that transitions of the output data are synchronized with transitions of RCK; it does not necessarily mean that the output data rate is fr. The input digital data are denoted DI; the output digital data are denoted DO.

Synchronization is accomplished by storing the data temporarily in a memory circuit 10 which has at least two memory elements. In the drawing, the memory circuit 10 has just two memory elements, labeled A and B. In general, there are M memory elements, where M is an integer greater than one. M does not depend on the value of N.

From the first clock signal WCK, a write control circuit 12 generates a write control signal that selects one of the M memory elements to receive the input data. In the drawing, memory elements A and B are selected alternately. In general, the M memory elements are selected cyclically.

The drawing depicts the write control circuit 12 as a rotor that makes one revolution for every two periods of the first clock signal WCK, that is, for every two bits of digital data. The write control signal consists of a pair of write pulses generated when the rotor passes an opposed pair of electrical contacts, selecting memory elements A and B alternately. Data are carried to the selected memory elements through the same contacts.

From the second clock signal RCK, a read control circuit 14 generates a read control signal that similarly selects the memory elements cyclically. In the drawing, the read control signal consists of a pair of read pulses that select memory elements A and B alternately. The data stored in the selected memory element are output at the data output terminal 8.

Since RCK has a higher frequency than WCK, the phase of the read control signal can be more finely controlled than the phase of the write control signal. In FIG. 1 this is depicted by giving the read control circuit 14 two selectable rotors, both of which make one revolution per four periods of RCK, or one revolution per two periods of WCK. The pair of read pulses constituting the read control signal can be generated from either the inner rotor or the outer rotor. The dotted signal lines are used when the inner rotor is selected.

The bit synchronization circuit also has a phase comparator 16 that compares the phase of the read and write control signals. In the drawing, the phase comparator 16 compares the phase of one of the two read pulses with the phase of one of the two write pulses. If the phase relation between the read and write control signals creates a danger of access conflict, the phase comparator 16 sends the read control circuit 14 a phase adjustment signal (ADJ), causing the read control circuit 14 to change the phase of the read control signal so as to move out of the danger area. In the drawing, this phase adjustment signal causes the read control circuit 14 to switch from the inner rotor to the outer rotor, or vice versa.

In FIG. 1, for simplicity, the same signal lines are shown as carrying both control signals and data. There are actually separate signal lines, as will be seen in later drawings.

The depiction of rotors in FIG. 1 is purely for explanatory purposes. The read and write control circuits 14 and 12 will normally be electronic circuits with no moving parts.

Next, a first embodiment of the invention will be described with reference to FIGS. 2 and 3.

Figure 2:
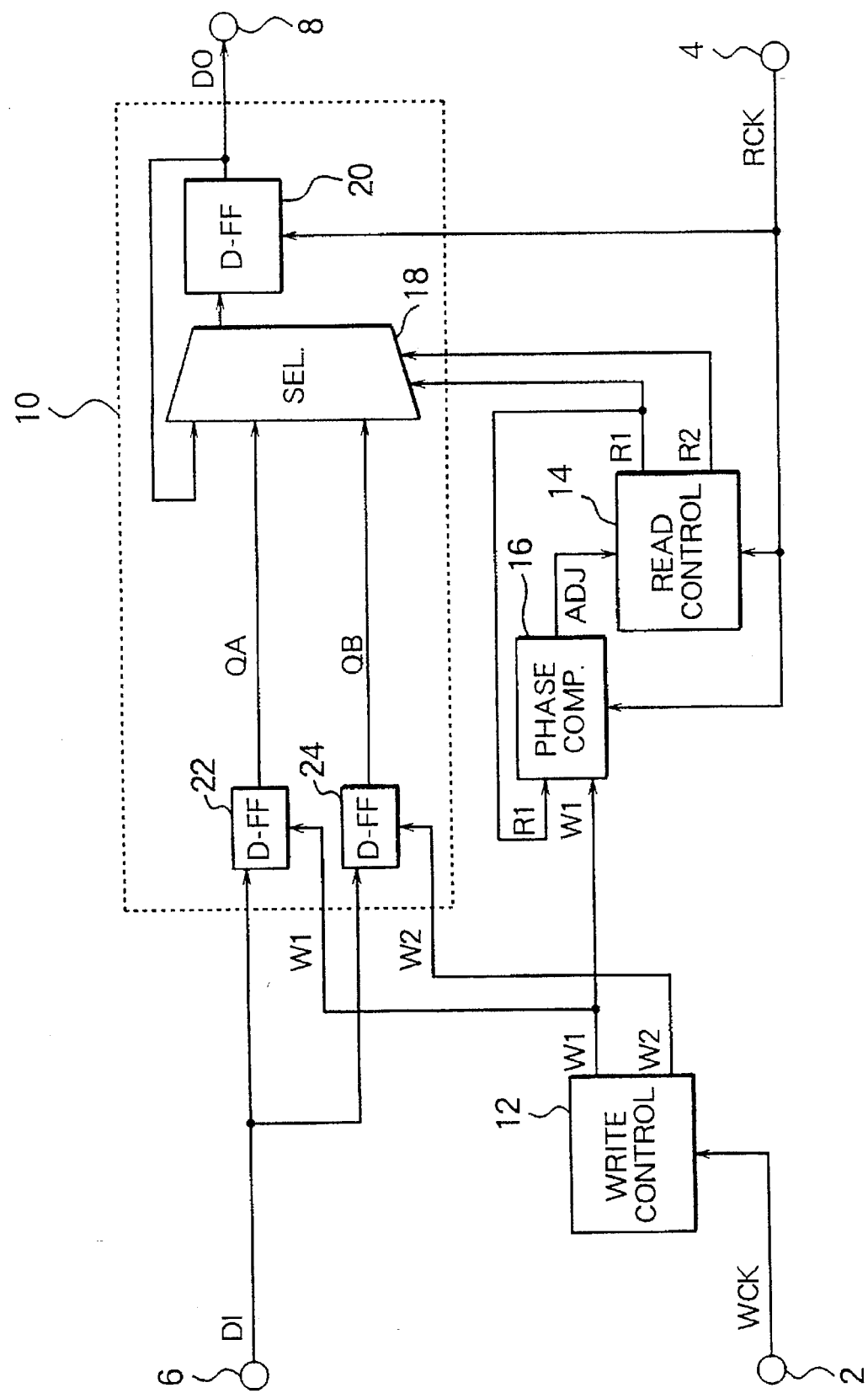
FIG. 2 is a block diagram illustrating a first embodiment of the invention.

FIG. 2 shows a block diagram of the first embodiment, using the same reference numerals as in FIG. 1 to identify equivalent parts. The memory circuit 10 in the first embodiment comprises a selector 18 and three D-type flip-flops 20, 22, and 24. A D-type flip-flop is a type of latch, and these circuits will be referred to as latches below. Latches 22 and 24 correspond to memory elements A and B in FIG. 1. Latch 20 will be referred to as the output latch.

The write control circuit 12 receives the first clock signal WCK and generates a write control signal comprising a pair of complementary latch timing signals W1 and W2. The read control circuit 14 receives the second clock signal RCK and generates a read control signal comprising a pair of selector timing signals R1 and R2. The phase comparator 16 receives W1, R1, and RCK, and generates the phase adjustment signal ADJ.

These circuits are interconnected as shown. The latches 22 and 24 latch the data DI received from the data input terminal 6 at rising transitions of respective latch timing signals W1 and W2. The selector 18 selects the output of one of the three latches 20, 22, and 24 according to the selector timing signals R1 and R2, and supplies the selected signal to the output latch 20. The output DO of latch 20 itself is selected when R1 and R2 are both inactive. The output QA of latch 22 is selected when R1 is active. The output QB of latch 24 is selected when R2 is active. R1 and R2 are never active simultaneously. Latch 20 latches the output of the selector 18 at falling transitions of the second clock signal RCK. The output DO of latch 20 is supplied to the data output terminal 8.

The selector 18 comprises logic circuits such as inverters, NAND gates, and NOR gates. Circuit details will be omitted as they will be obvious to those skilled in the art.

The selector 18 and output latch 20 could be incorporated into the read control circuit 14, in which case the memory circuit 10 would comprise only the latches 22 and 24.

The operation of this embodiment will be described with reference to the timing diagram in FIG. 3. Timing signals W1, W2, R1, and R2 are shown as active high.

Figure 3:
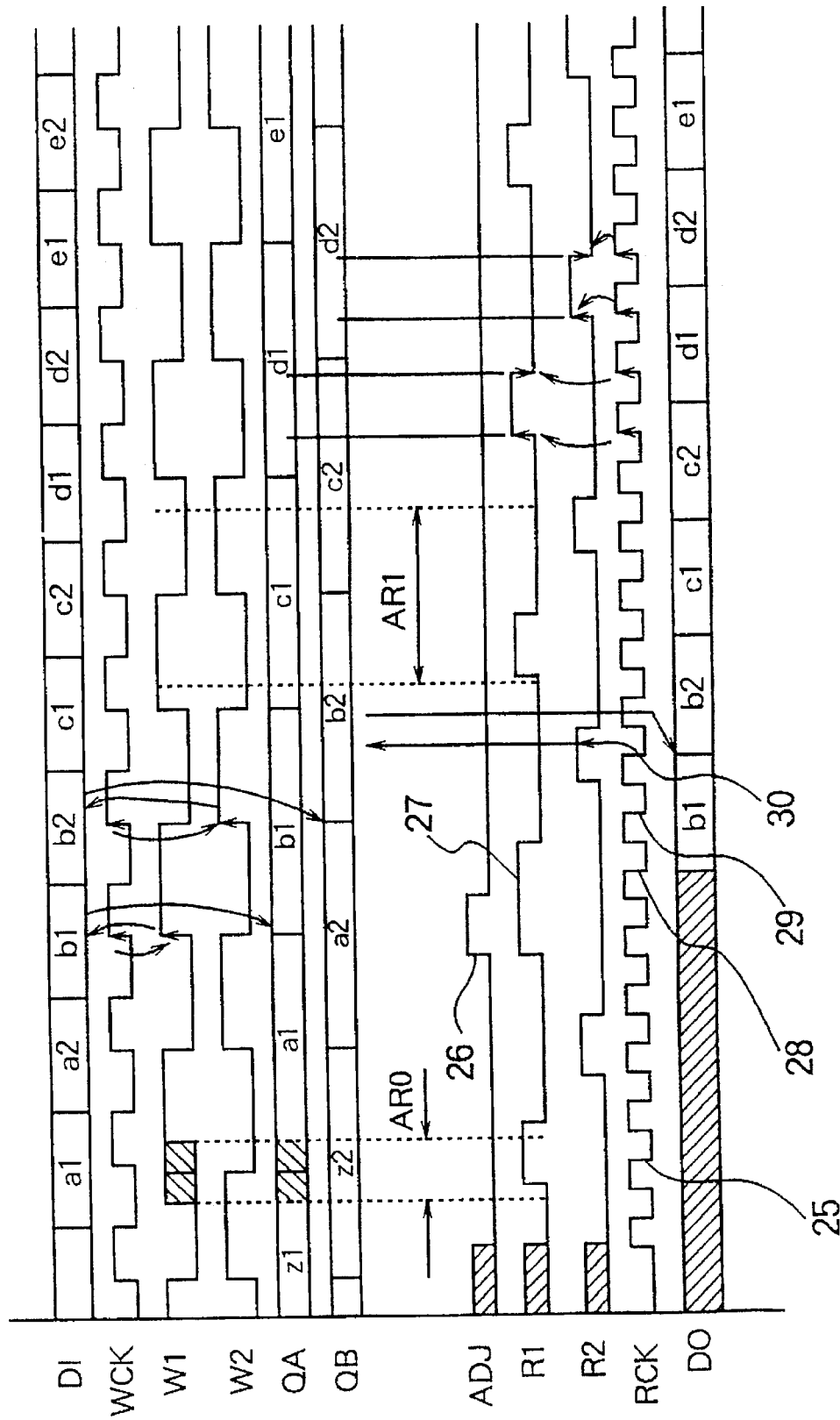
FIG. 3 is a timing diagram illustrating the operation of the first embodiment.

As shown at the top of FIG. 3, the input data DI are synchronized with the first clock signal WCK so that transitions of the data DI occur at falling transitions of WCK. Successive bits of input data are denoted by the symbols a1, a2, b1, b2, c1, c2, and so on.

The write control circuit 12 is a divide-by-two counter that toggles the latch timing signals W1 and W2 at every rising transition of WCK. Arrows in the drawing indicate how the latch timing signals W1 and W2 cause latches 22 and 24 to latch alternate bits of the input data DI. Bits a1, b1, c1, and so on are latched in latch 22 at rising transitions of latch timing signal W1, causing the output QA of latch 22 to change at these timings. Similarly, bits a2, b2, c2, and so on are latched in latch 24 at rising transitions of latch timing signal W2, causing the output QB of latch 24 to change at those timings.

The second clock signal RCK is independent from and not synchronized with the first clock signal WCK, so transitions of RCK have no particular relation to transitions of WCK. The frequency fr of RCK is twice (in general, N times) the frequency fw of WCK. The output latch 20 is triggered by falling transitions of RCK, so the output data DO change at falling transitions of RCK, as shown at the bottom of FIG. 3.

The read control circuit 14 is a type of divide-by-four (in general, divide-by-M×N) counter adapted to generate one R1 pulse and one R2 pulse for every four (M×N) RCK periods. The R1 and R2 pulse signals have a duty cycle of ¼ [in general, 1/(M×N)], and are offset with respect to each other by a phase angle of 180°. Each R1 or R2 pulse occupies one period of the second clock signal RCK, from one rising transition of RCK to the next rising transition of RCK, as indicated by arrows at the right in FIG. 3, near bit d1. The phase adjustment (ADJ) pulse produced by the phase comparator 16 delays both R1 and R2 by one period of RCK.

The read control circuit 14 can be constructed by cascading two divide-by-two counters and performing AND and AND-NOT logic operations on their two outputs, or in various other ways. Circuit details will be omitted, as they will be obvious to those skilled in the art.

In this first embodiment, access conflict is considered to have occurred if the output latch 20 latches the QA output at the first falling edge of RCK after a transition of the QA output. The phase comparator 16 accordingly detects an access conflict when rising transitions of W1 and R1 are separated by less than one-half of one period of RCK. This rule establishes an access conflict area AR0 around each rising transition of W1. If a rising transition of R1 occurs within this access conflict area, the phase comparator 16 produces a phase adjustment pulse (ADJ) at the next rising transition of R1.

In the timing example shown in FIG. 3, the second clock signal RCK starts up shortly before the arrival of bit a1. The first R1 pulse is produced at the next rising transition of RCK. The rising transition of this R1 pulse occurs in the access conflict area AR0. The falling transition 25 of RCK that causes the output latch 20 to latch the output of latch 22 therefore occurs shortly after the output QA of latch 22 has changed from bit z1 to bit a1. Because of propagation delay in the selector 18, it is not certain whether the output latch 20 will acquire the old bit z1 or the new bit a1, and in any case the necessary hold time or setup time requirement may not be satisfied. The bit value latched in the output latch 20 is therefore ambiguous, as indicated by cross-hatching of the output data DO at this point.

At the following R2 pulse, it is similarly uncertain whether the output latch 20 will acquire bit z2 or bit a2 from the output QB of latch 24, so the output data DO remain ambiguous.

Since access conflict has been detected, however, at the next rising transition of R1, the phase comparator 16 generates a phase adjustment pulse 26 that sets the phase of R1 and R2 back by one RCK period. The R1 pulse 27 is thereby prolonged for a second RCK period. At the falling transition 28 of RCK in this second RCK period, the output latch 20 again latches the output QA of latch 22, which is now unambiguously bit b1. The output DO is therefore bit b1.

At the next falling transition 29 of RCK after that, R1 and R2 are both low, so the selector 18 selects the output data DO (bit b1) of latch 20, and latch 20 latches this bit b1 again. The output DO therefore dwells on bit b1 for two periods of the second clock signal RCK.

At the next falling transition 30 of RCK, R2 is high, so selector 18 selects the output QB of latch 24 (bit b2) and output latch 20 latches this bit, as indicated by arrows. The output DO now changes from bit b1 to bit b2.

At the next falling transition of RCK, R1 and R2 are both low, so bit b2 is recycled through the output latch 20 and the output DO remains b2 for a second RCK period.

Proceeding in this way, the circuit outputs bits c1, c2, and so on for two RCK periods each, as shown.

Each bit latched by latch 22 and output as signal QA can be read without access conflict by a selector timing pulse R1 in a safe area AR1 complementary to area AR0. The drawing shows the AR1 area corresponding to bit c1. The phase adjustment pulse 26 has pushed the phase of R1 into a position near the front of this area. Clock jitter may cause further movement of the phase of R1, but as long as the rising transition of R1 stays in area AR1, the bits will be output correctly.

Although not indicated in FIGS. 2 and 3, the read control circuit 14 preferably outputs a data clock signal to accompany the output data DO, to indicate timings at which the output data bits are valid and can be read. This external data clock signal can be produced by, for example, taking the logical OR of R1 and R2, with rising transitions of R1 and R2 indicating the timings at which the output data DO should be read.

The read control circuit 14 may also output the ADJ signal, to notify external circuits when a bit slip has occurred. Alternatively, the read control circuit 14 may be adapted to count the number of ADJ pulses produced during a specified interval and supply the count value to external circuitry.

The first embodiment provides the capability to absorb clock jitter within the area AR1 in FIG. 3, which has a width of 1.5 bit periods. The phase relationship between the first and second clock signals WCK and RCK can vary within this range without causing bit slip.

It should be noted that the first embodiment does not rely on correct initial alignment of the phase of the first and second clock signals WCK and RCK. If the initial phase relationship causes access conflict, as in FIG. 3, this condition will be corrected at once by a phase adjustment signal. Similarly, the first embodiment recovers quickly from such clock irregularities as missing clock pulses or momentary interruption of the first or second clock signal.

The phase adjustment rule in the first embodiment can be varied. When an access conflict is detected, the next R1 pulse could be advanced by one RCK period, or advanced or delayed by two RCK periods, instead of being delayed by one clock period.

An advantage of the first embodiment over the conventional elastic store method is that the latching of data in the output latch 20 reduces the range of access conflict. If data were to be output from the selector 18 directly to the data output terminal 8, as in the conventional elastic store method, the width of the access conflict area in the phase cycle of the write control signal would be one full bit period (two RCK periods), whereas in the first embodiment the width of the access conflict area is only one-half of one bit period (one RCK period).

In general, the access conflict area consists of one or more periods (or half-periods) of the second clock signal RCK. If the frequency of the second clock signal is sufficiently high, (if the value of N is sufficiently large), the access conflict area can be defined to closely match the setup and hold timing requirements of the output latch 20, and the propagation delay characteristics of other circuits elements. The capability to optimize circuit operations to fit these fixed timing characteristics is extremely useful in the design of the bit synchronization circuit, particularly when high-speed data signals must be synchronized. This capability is lacking in the conventional elastic store method, in which the phase of the write control signals is adjusted and all adjustments must be in whole multiples of the bit period.

Next a second embodiment of the invention will be described with reference to FIGS. 4 and 5. The second embodiment has the same hardware configuration as the first, illustrated in FIG. 2, but employs a different type of phase adjustment rule.

Figure 4:
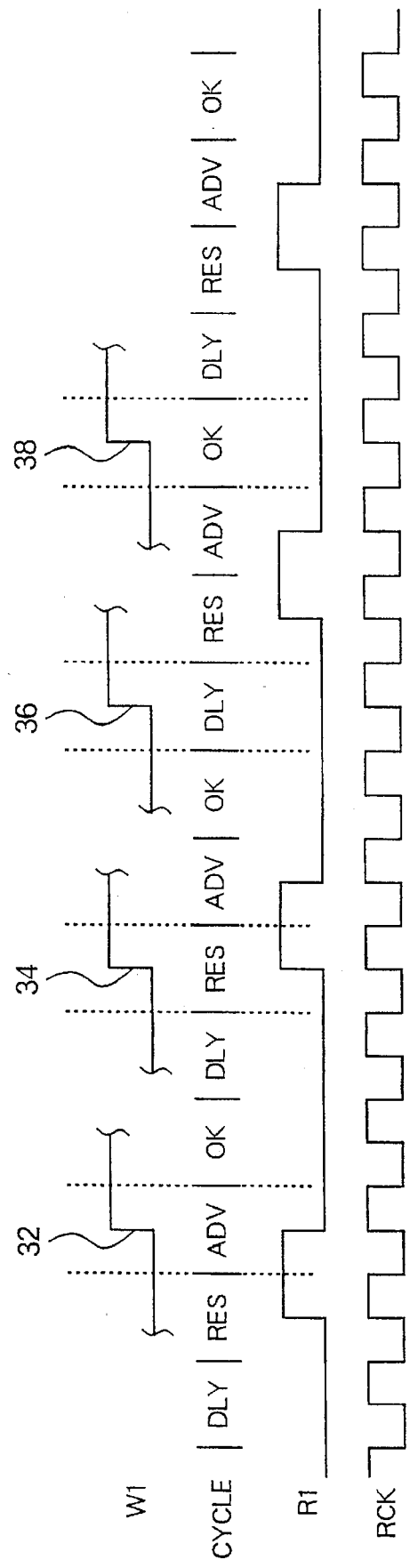
FIG. 4 is a timing diagram illustrating the phase adjustment rule of a second embodiment.

Referring to FIG. 4, the phase comparator 16 of the second embodiment distinguishes among four (in general M×N) types of RCK periods, in relation to the phase of R1. The four types are denoted DLY (delay), RES (reset), ADV (advance), and OK in the drawing. R1 rises in the center of a RES period, and falls in the center of an ADV period. The phase adjustment signal has four states, depending on the type of period in which the rising transition of the latch timing signal W1 occurs.

The phase adjustment signal may comprise, for example, three pulse signals carried on separate signal lines. A first signal line delivers an ADV pulse to the read control circuit 14 when a rising transition of W1 occurs in an ADV period, as illustrated by transition 32. This pulse causes the read control circuit 14 to advance the phase of the read control signals R1 and R2 by one RCK period. A second signal line delivers a RES pulse when a rising transition of W1 occurs in a RES period, as illustrated by transition 34. This pulse causes the read control phase to be delayed by two RCK periods. A third signal line delivers a DLY pulse when a rising transition of W1 occurs in a DLY period, as illustrated by transition 36. This pulse, like the ADJ pulse in the first embodiment, causes the read control signal phase to be delayed by one signal period. If the rising transition of W1 occurs in an OK period, as illustrated by transition 38, no phase adjustment is necessary and no pulse is output.

If, due to a phase adjustment, the interval between R1 pulses is more or less than four RCK periods, then OK periods can be added or deleted to compensate.

Figure 5:
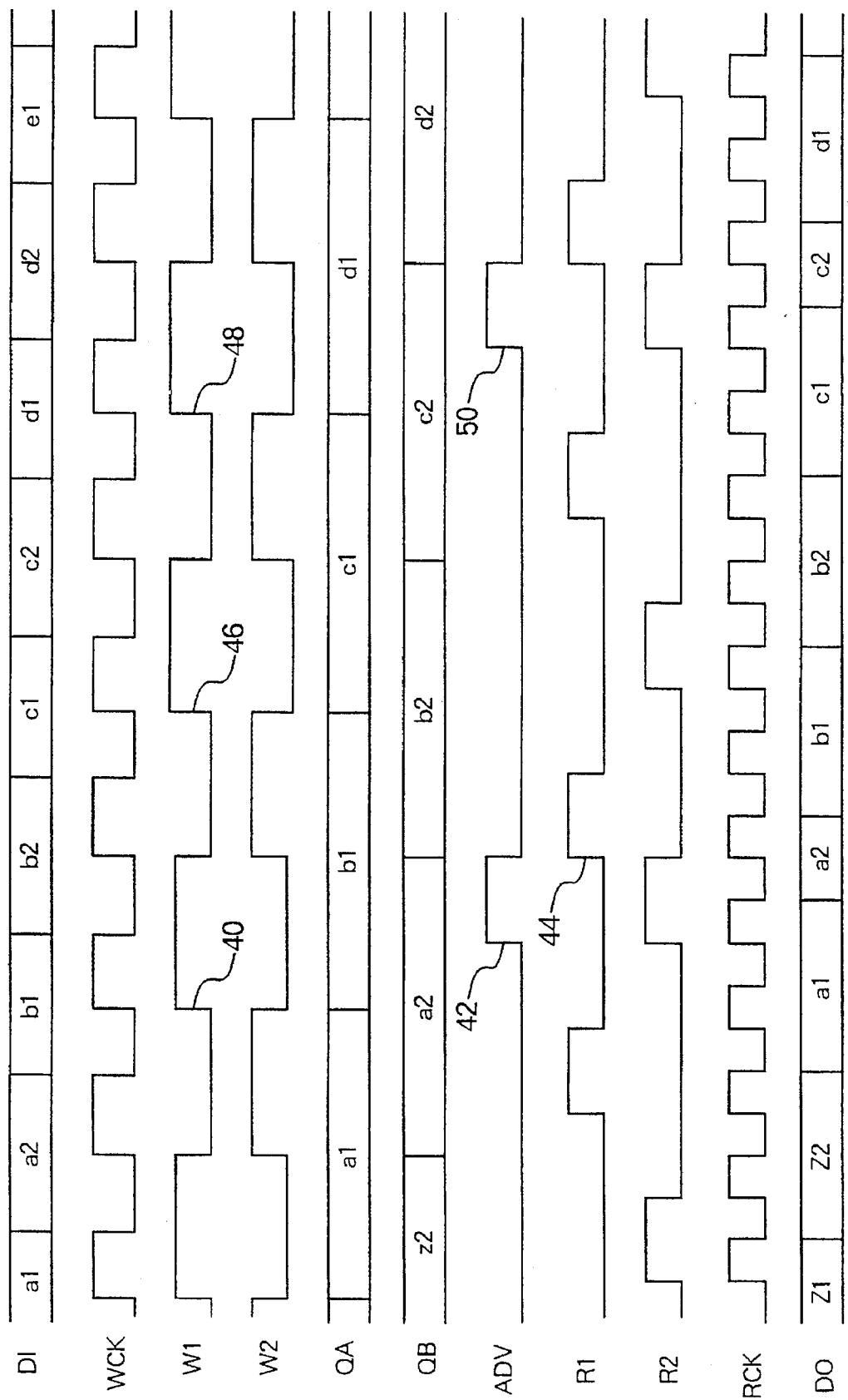
FIG. 5 is a timing diagram illustrating the operation of the second embodiment.

FIG. 5 illustrates the operation of the second embodiment when the frequency of the second clock signal RCK is slightly less than twice the frequency of the first clock signal WCK (N=1.75, approximately, in the drawing). This is a condition which might result from oscillator frequency error, and which would lead to recurrent and frequent bit slip in the conventional elastic store method.

As can be seen by comparing FIGS. 4 and 5, rising transition 40 of the latch timing signal W1 in FIG. 5 occurs in an ADV period, causing output of an ADV pulse 42. This causes the read control circuit 14 to advance the phase of the next R1 pulse 44 by one RCK period, as shown. As a result, bit a2 is output for only one RCK period. Bit b1 is output for the normal two RCK periods.

The next rising transition 46 of the latch timing signal W1 occurs in an OK period. No phase adjustment pulse is produced, and bits b2 and c1 are output normally.

The next rising transition 48 of W1 occurs in an ADV period again, causing output of another ADV pulse 50 and another advance in the phase of the read control signals R1 and R2. As a result, bit c2 is output for only one RCK period, but the next bit d1 is output for the normal two periods.

Continuing in this way, by outputting every fourth bit of data for only one RCK period, the second embodiment is able to output all bits in the correct order, without losing any bits. As in the first embodiment, the read control circuit 14 should provide external output of a data clock signal (not visible) to indicate when the output data DO should be read. The rising transitions of R1 and R2 can again be used as these external read timings.

The phase adjustment rule illustrated in FIGS. 4 and 5 gives the second embodiment the capability to absorb not only clock jitter but also a considerable degree of clock frequency error, without causing bit slip. This is a capability not provided by the conventional elastic store method.

If the departure of the frequency of the second clock signal RCK from an integer multiple of the frequency of the first clock signal WCK is intentional, rather than due to frequency error, then the second embodiment provides the capability for speed conversion of the data signal. This is another capability not provided by the conventional elastic store method.

The phase adjustment rule in the second embodiment is suitable when N is approximately equal to two. If N has a higher value, the phase adjustment rule can be further refined to reduce the probability of bit slip.

Next a third embodiment of the invention will be described with reference to FIGS. 6 and 7. The same reference numerals and other symbols as in FIGS. 2 and 3 will be used to identify identical or equivalent parts.

Figure 6:
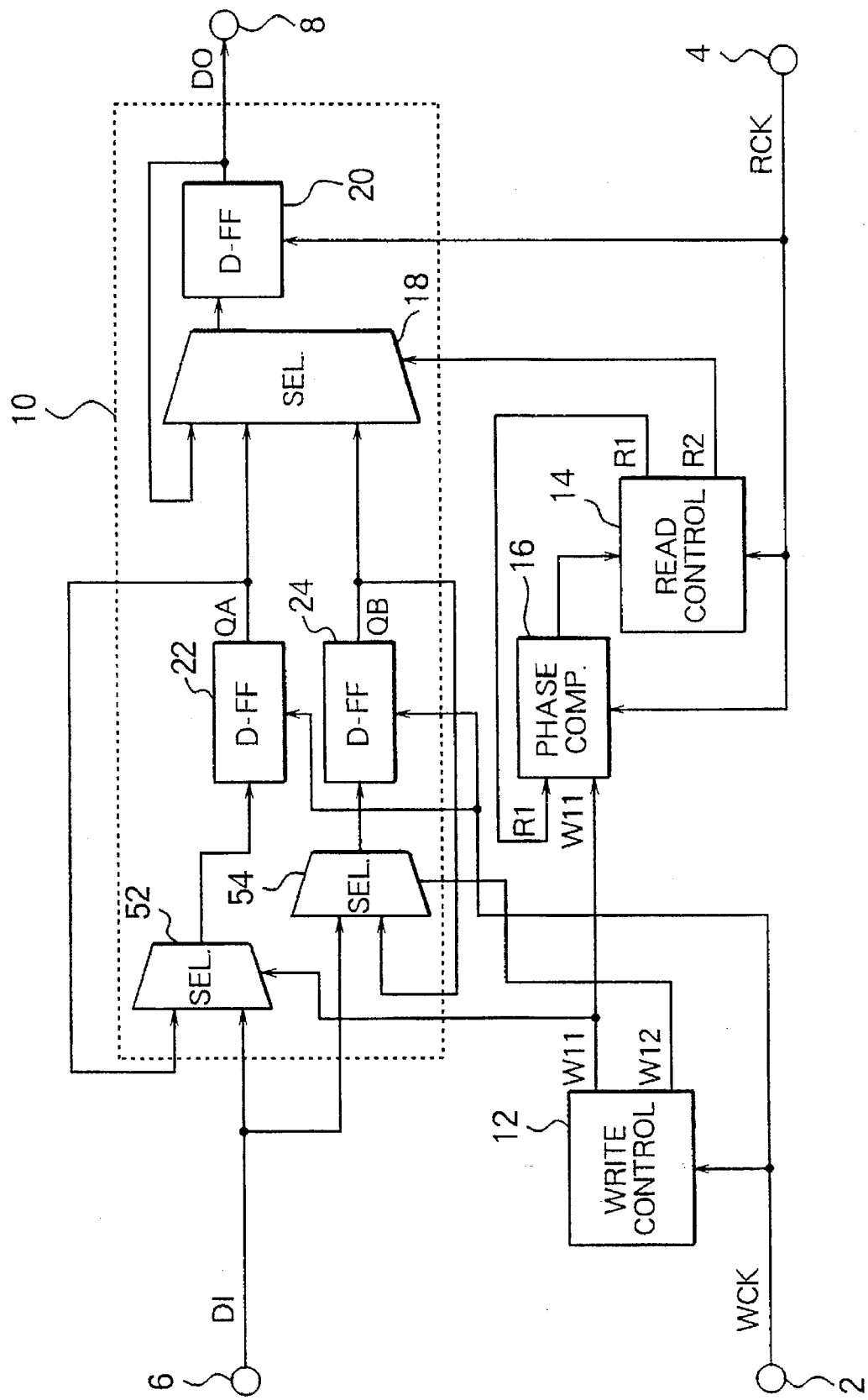
FIG. 6 is a block diagram illustrating a third embodiment.

The hardware configuration of the third embodiment, shown in FIG. 6, is similar to that of the first embodiment except for the structure of the memory circuit 10, which now has an additional pair of selectors 52 and 54. Selector 52 selects either the input data DI or the output QA of latch 22 according to a timing signal W11 received from the write control circuit 12, and supplies the selected signal as input to latch 22. Similarly, selector 54 selects either the input data DI or the output QB of latch 24 according to a timing signal W12 received from the write control circuit 12, and supplies the selected signal as input to latch 24. The first clock signal WCK is supplied as a latch timing signal to both latches 22 and 24.

Figure 7:
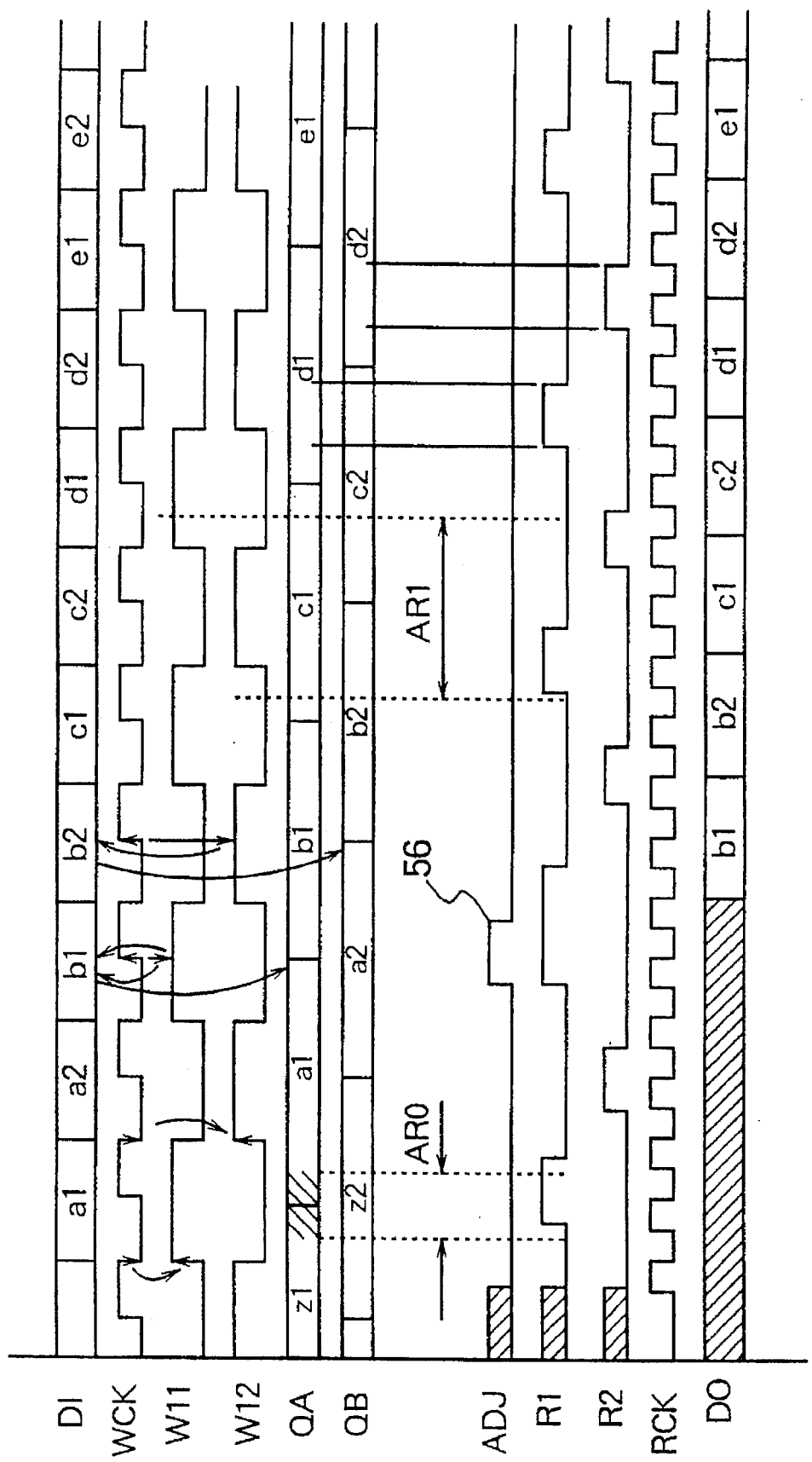
FIG. 7 is a timing diagram illustrating the operation of the third embodiment.

Referring to FIG. 7, the timing signals W11 and W12 are complementary, and their rising and falling transitions are synchronized with falling transitions of the first clock signal WCK, hence with the transitions of the input data DI. The timing signals W11 and W12 are offset in phase by one-half WCK period from the latch timing signals W1 and W2 in the first embodiment.

Selector 52 selects the input data DI when W11 is high, and the output QA of latch 22 when W11 is low. Latch 22 therefore latches the input data DI at rising transitions of WCK when W11 is high, and latches its own output QA at rising transitions of WCK when W11 is low. For example, after latching bit b1 at the rising transition of WCK when W11 is high, as indicated by arrows in FIG. 7, at the next rising transition of WCK, since W11 is low, latch 22 latches its own output b1 again. Bits a1, b1, c1, and so on are therefore held in latch 22 for two WCK periods each.

Similarly, bits a2, b2, c2, and so on are held in latch 24 for two WCK periods each.

The phase adjustment rule in the third embodiment is similar to the rule in the first embodiment. An access conflict is detected if the output latch 20 latches a QA bit on the first rising transition of RCK after the QA transition. The access conflict area AR0 has a width of one RCK period, centered on rising transitions of WCK at which W11 is high. The phase comparator 16 can detect an access conflict as a delay of 0.5 to 1.5 RCK periods from the rise of WCK to the rise of RCK, or in various other ways. To simplify access conflict detection, the phase comparator 16 may also receive the first clock signal WCK.

The operation of the third embodiment is similar to the operation of the first embodiment. In FIG. 7, an access conflict is detected when a rising transition of R1 occurs in the access conflict area AR0, causing output of a phase adjustment pulse (ADJ) 56 at the next R1 pulse. This ADJ pulse 56 sets the phase of R1 and R2 back by one RCK period. Bits b1, b2, c1, and so on appear correctly in the output data DO following the phase adjustment pulse ADJ.

The third embodiment provides the same effect as the first embodiment: the capability to absorb clock jitter within the range AR1, which has a width of 1.5 bit periods.

The third embodiment is advantageous when the processing delay in the write control circuit 12 is larger than the propagation delay in the selectors 52 and 54. In the first embodiment, a large delay in the write control circuit 12 could impair the synchronization between the input data DI and the operation of latches 22 and 24. In the third embodiment this loss of synchronization does not occur, because the latches 22 and 24 are driven by the first clock signal WCK.

The third embodiment can be varied by driving latch 22 with the logical AND of WCK and W11, and driving latch 24 with the logical AND of WCK and W12, instead of providing selectors 52 and 54. The same effect is obtained.

The phase adjustment rule of the third embodiment can be modified as explained in the second embodiment, to provide the capability to absorb frequency error as well as clock jitter.

Figure 8:
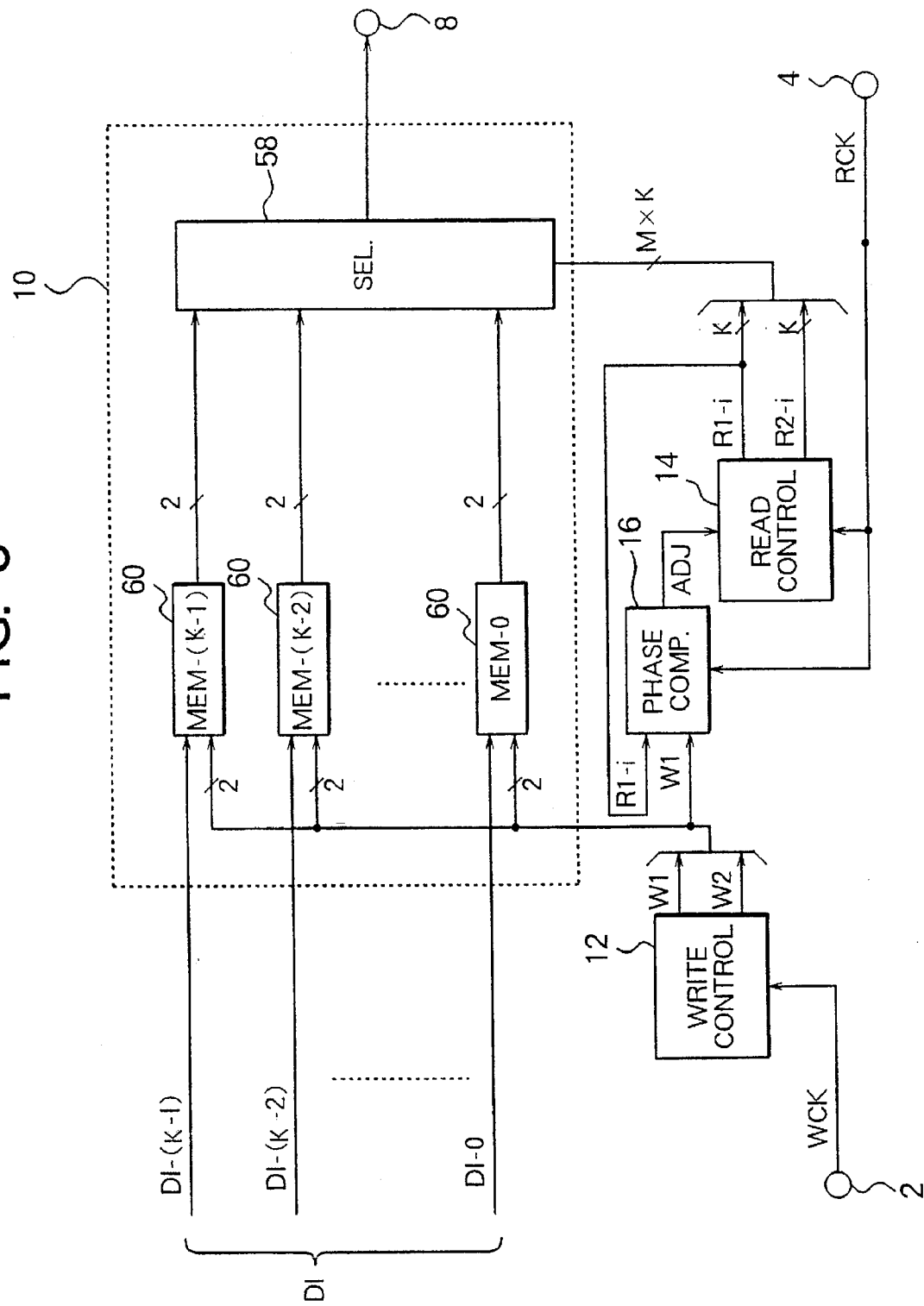
FIG. 8 is a block diagram illustrating a fourth embodiment.

Next, a fourth embodiment will be described with reference to FIGS. 8, 9, and 10. The same reference numerals as in FIG. 2 will be used to identify the write control circuit 12, read control circuit 14, and phase comparator 16, although the read control circuit 14 and phase comparator 16 operate somewhat differently from in the preceding embodiments.

The fourth embodiment functions both as a bit synchronization circuit and as a multiplexer that converts K-bit parallel input data to serial output data, where K is an integer greater than one. The frequency of the second clock signal RCK is N times the frequency of the first clock signal WCK, where in the present embodiment, N is equal to K. There are now K parallel input bit lines, denoted DI-0, ..., DI-(K–2), DI-(K–1).

The memory circuit 10 of the fourth embodiment has a selector 58 and K identical memory units 60, each consisting of M memory elements, where M is an integer greater than one. In the drawing, these K memory units 60 are identified as MEM-0, ..., MEM-(K–2), MEM-(K–1). Memory unit MEM-i latches data input on bit line DI-i.

Figure 9:
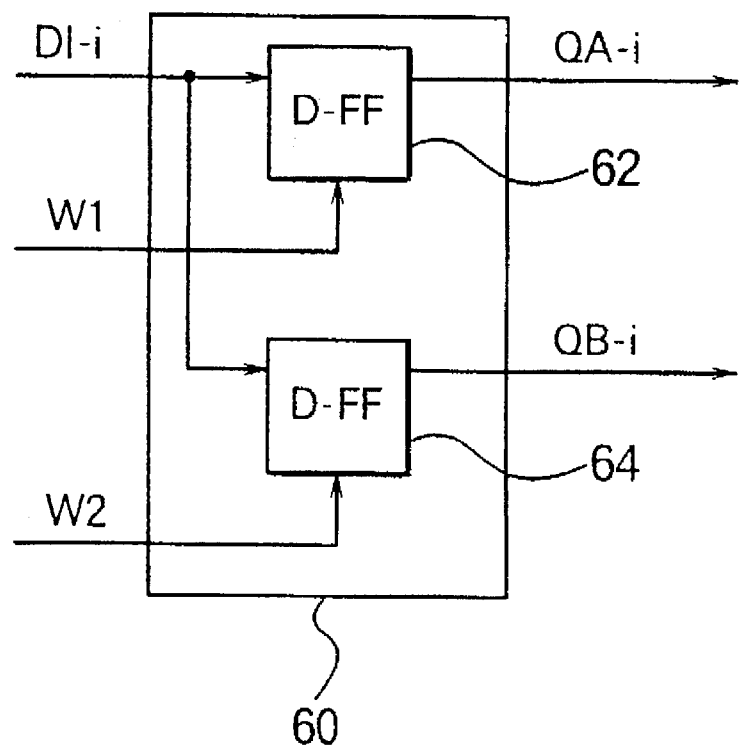
FIG. 9 is a more detailed block diagram illustrating one pair of memory elements in the fourth embodiment.

FIG. 9 shows the structure of a memory unit 60 when M is equal to two. A memory unit 60 then consists of two D-type flip-flops or latches 62 and 64, which are driven by complementary latch timing signals W1 and W2 output from the write control circuit 12. Both latches 62 and 64 receive the same input data, from bit line DI-i. The outputs of latches 62 and 64 will be identified as QA-i and QB-i.

Figure 10:
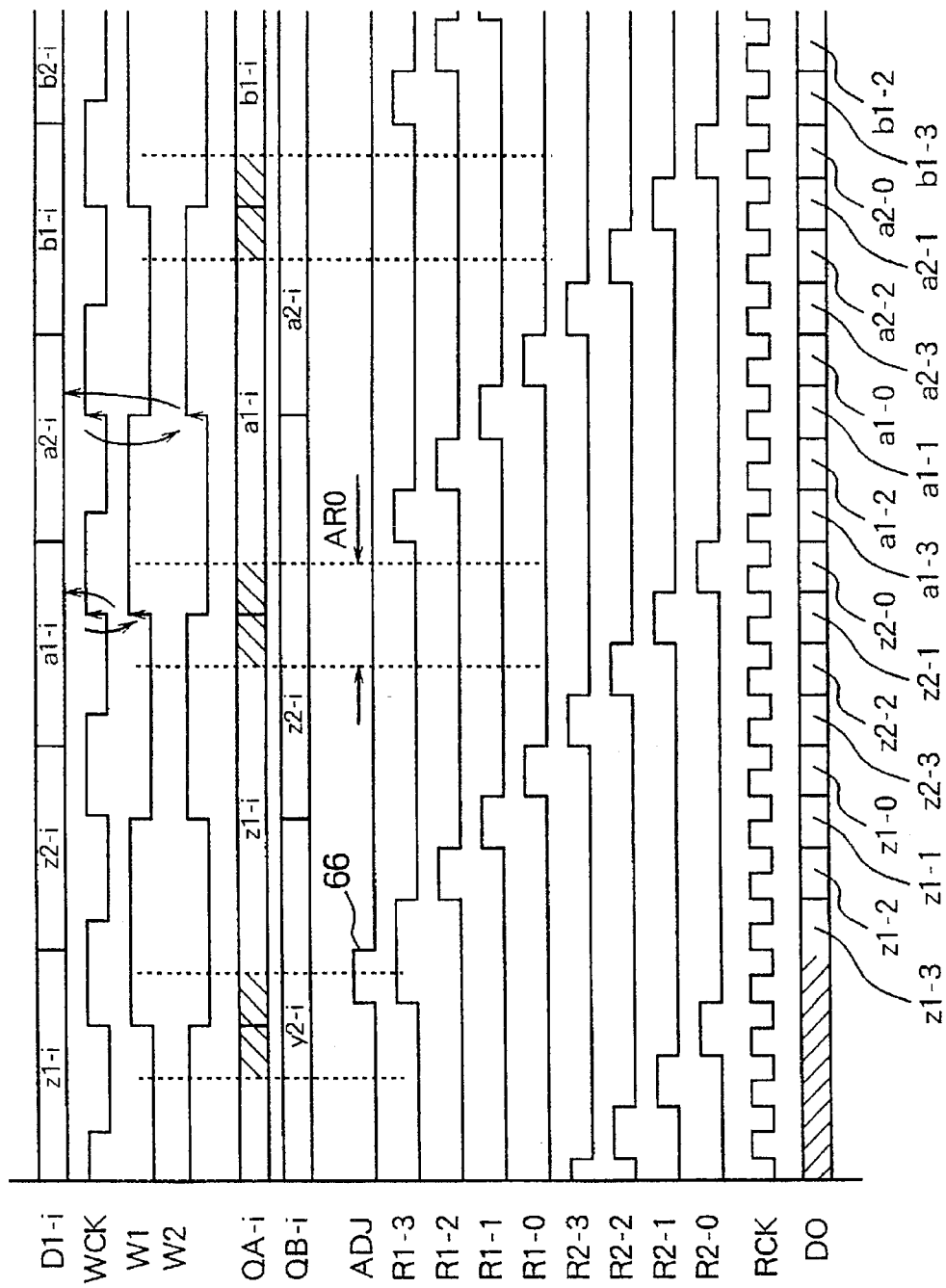
FIG. 10 is a timing diagram illustrating the operation of the fourth embodiment.

Referring to FIG. 10, when M is two, the write control circuit 12 operates as in the first embodiment; the complementary latch timing signals W1 and W2 are toggled at each rising transition of the first clock signal WCK. Successive bits of data on bit line DI-i, identified at the top of FIG. 10 as z1-i, z2-i, a1-i, a2-i, and so on, are latched in latches 62 and 64 in the same way as in the first embodiment, each of the latch outputs QA-i and QB-i holding the same value for two WCK periods.

FIG. 10 illustrates the operation of the fourth embodiment when M is two and K is four. The read control circuit 14 then outputs M×K (eight) selector timing signals R1-3, ..., R1-0, R2-3, ..., R2-0. The selector 58 selects latch output QA-i when selector timing signal R1-i is high, and selects latch output QB-i when selector timing signal R2-i is high. The eight selector timing signals have a duty cycle of ⅛ [in general, 1/(M×K)], and go high in a repeating cyclic pattern as shown, so that at any given time exactly one selector timing signal is high. The high pulse width of each selector timing signal is one period of the second clock signal RCK, extending from one rising transition of RCK the next rising transition.

The phase comparator 16 receives the four selector timing signals R1-i that select outputs QA-i, and detects an access conflict if a rising transition of any of these four selector timing signals R1-i occurs in an access conflict area AR0 centered around the rising transitions of W1. The width of the access conflict area AR0 in the fourth embodiment is one-half of one WCK period, or two RCK periods. When an access conflict is detected, a phase adjustment signal ADJ is output, causing the read control circuit 14 to delay the phase of the selector timing signals by one RCK period, as in the first embodiment.

In FIG. 10, the initial phase of the selector timing signals causes R1-3 to rise within the access conflict area, making correct output of bit z1-3 uncertain. The phase adjustment pulse 66 output by the phase comparator 16 sets the phase back by one RCK period, however, after which bits z1-3, z1-2, z1-1, and so on are output correctly.

Although the width of the access conflict area AR0 in the fourth embodiment is only two RCK periods, all four selector timing signals R1-i must be kept out of this area. Of the eight possible phase positions of the selector timing signals, in general five will lead to access conflict. Access conflict can be detected as the occurrence of a rising transition of W1 in any of a five RCK periods: the four periods in which the R1-i selector timing signals are high, and the period just before R1-3 goes high.

In the worst case, five phase adjustment signals may be required to bring the phase of the selector timing signals into the safe area. The phase adjustment rule can be adapted, however, to make the size and direction of the phase adjustment depend on which of the four signals R1-i was found to rise within the access conflict area AR0. One example of this type of rule delays the phase by different amounts depending on which selector timing signal is active (high) at each rising transition of W1, as indicated in Table 1. This rule will usually correct access conflict in just one phase adjustment.

TABLE 1

| Alternative Phase Adjustment (Delay) Rule | | | | | | | | |
|---|---|---|---|---|---|---|---|---|
| Selector timing signal active at rise of W1 | R1-3 | R1-2 | R1-1 | R1-0 | R2-3 | R2-2 | R2-1 | R2-0 |
| Delay (RCK periods) | 3 | 4 | 5 | 6 | 0 | 0 | 0 | 2 |

The fourth embodiment can absorb clock jitter within a range of three RCK periods; that is, the phase relationship of RCK and WCK can vary within this range without causing bit slip. This effect is moreover obtained with the use of only two memory elements (latches) per input bit line. A circuit of the conventional type, that adjusted the phase of the write control signal, would require at least three memory elements per bit line.

The fourth embodiment (and the preceding embodiments) can also tolerate a certain degree of synchronization error between the first clock signal WCK and the input data transitions, as illustrated at the top of FIG. 10.

Next a fifth embodiment will be described with reference to FIGS. 11, 12, and 13. The same reference numerals and other symbols as in FIGS. 8, 9, and 10 will be used to denote identical or equivalent parts.

Figure 11:
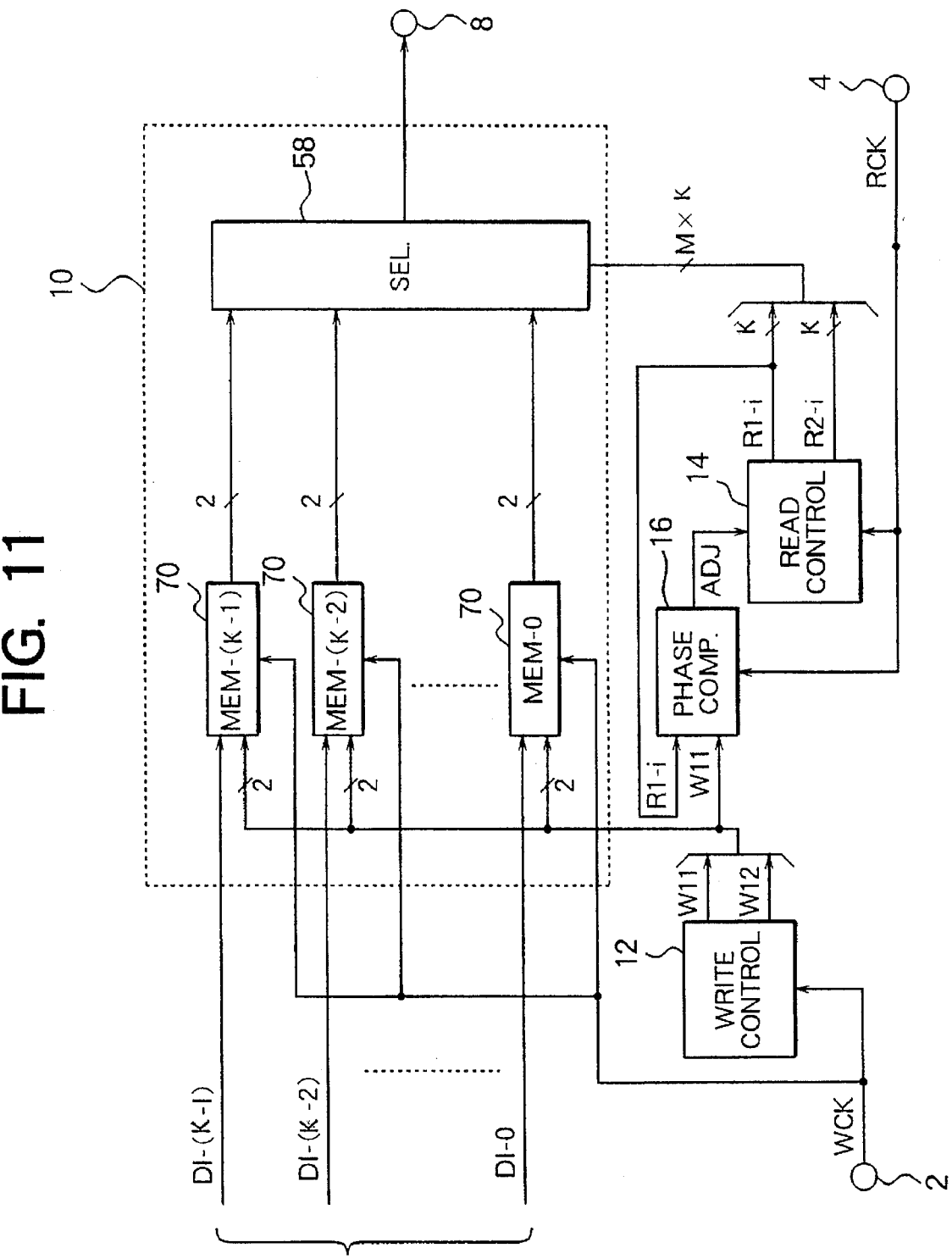
FIG. 11 is a block diagram illustrating a fifth embodiment.

Referring to FIG. 11, the hardware configuration of the fifth embodiment is generally similar to that of the fourth embodiment, but the first clock signal WCK is supplied to the memory circuit 10 as a latch timing signal, as in the second embodiment. The memory units 70 also differ in structure from the memory units 60 of the fourth embodiment.

Figure 12:
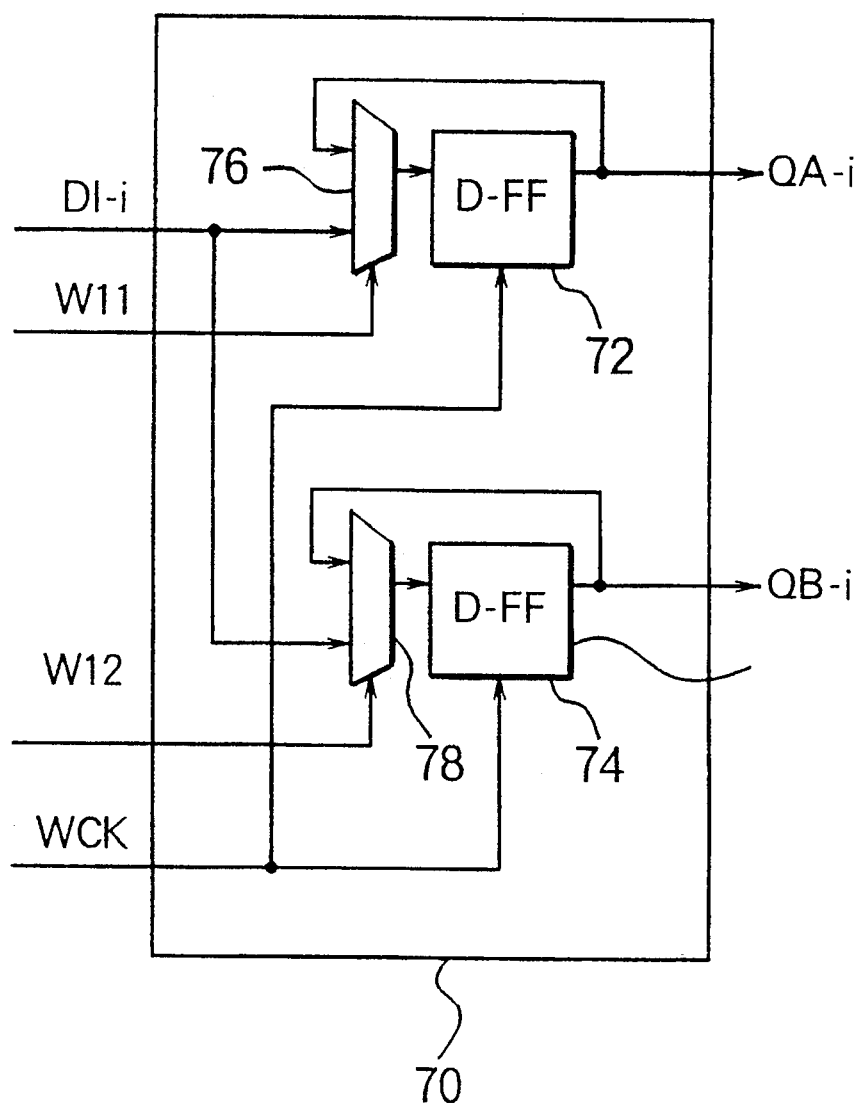
FIG. 12 is a more detailed block diagram illustrating one pair of memory elements in the fifth embodiment.

Referring to FIG. 12, each memory unit 70 comprises a pair of D-type flip-flops or latches 72 and 74, and a pair of selectors 76 and 78. Selector 76 selects input data DI-i or the output QA-i of latch 72 according to a write control signal W11 received from the write control circuit 12, and supplies the selected signal as input to latch 72. Similarly, selector 78 selects input data DI-i or the output QB-i of latch 74 according to a write control signal W12 received from the write control circuit 12, and supplies the selected signal as input to latch 74.

Figure 13:
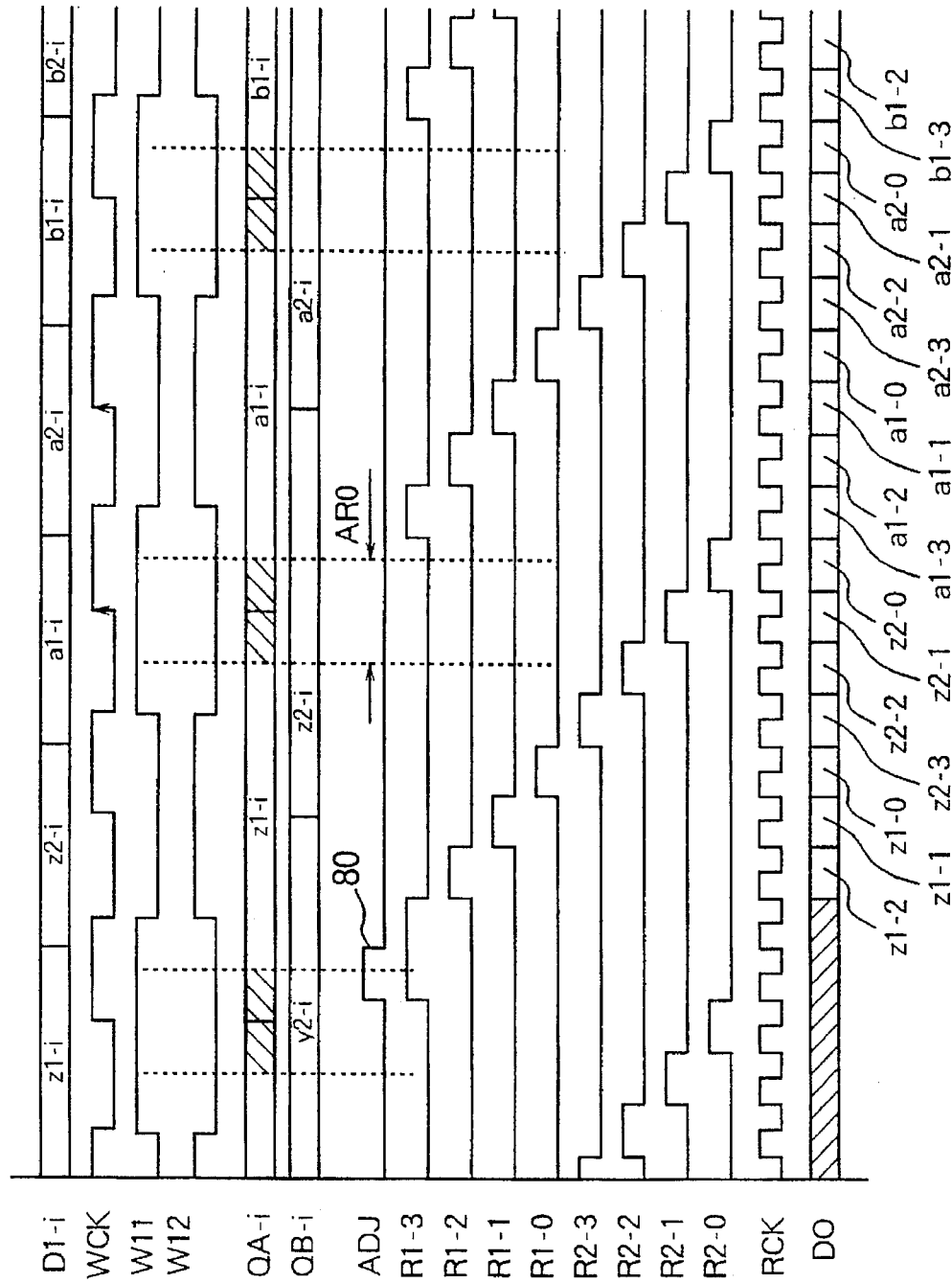
FIG. 13 is a timing diagram illustrating the operation of the fifth embodiment.

Referring to FIG. 13, the fifth embodiment operates on the same principles as the third and fourth embodiments. A detailed description will be omitted, except to note that a phase adjustment pulse 80 is shown making the same type of correction as in the fourth embodiment. The access conflict area AR0 is the same as in the fourth embodiment. Access conflict can now be detected as the occurrence of a rising transition of W11 in an RCK period in which R2-2, R2-1, R2-0, R1-3, or R1-2 is high.

The fifth embodiment provides the same effects as the third and fourth embodiments: multiplexing of four-bit parallel input data to create serial output data; the ability to absorb clock jitter within a range of three RCK periods; and accurate synchronization of the latch timing with the input data.

The fourth or fifth embodiment can be combined with a phase adjustment rule of the type shown in the second embodiment to provide the additional capability to absorb frequency error without bit slip, or to perform data speed conversion, over and above the speed conversion necessitated by parallel-to-serial conversion.

Although speed conversion can be carried out with only two memory elements per input data line, as shown in the second embodiment, additional operating margin can be gained by providing more memory elements per bit, i.e., making M greater than two. The invention is not restricted to any particular value of M.

In the fourth and fifth embodiments, it is not necessary for the number K of parallel bits of input data to be equal to the ratio N between the first and second clock frequencies. In general, there will be K bits of parallel data, and M sets of memory elements, consisting of K memory elements apiece. In the fourth embodiment, for example, there were two sets of memory elements: a first set comprising the four memory elements 62 (in the four memory units 60) selected by write control signal W1; and a second set comprising the four memory elements 64 (in the same four memory units 60) selected by write control signal W2. N must be equal to or greater than K. Even if N is greater than K, M can be equal to two, as in FIGS. 9 and 12.

Those skilled in the art will recognized that various other modifications can be made within the scope claimed below.

What is claimed is:

1. A bit synchronization circuit, comprising:
a first clock terminal for receiving a first clock signal having a first frequency;
a second clock terminal for receiving a second clock signal having a second frequency which is N times said first frequency, where N is an integer greater than unity;
a data input terminal for receiving digital data synchronized with said first clock signal;
a data output terminal for output of said digital data;
a memory circuit with at least two memory elements, for temporarily storing said digital data;
a write control circuit coupled to said first clock terminal and said memory circuit, for generating a write control signal, synchronized with said first clock signal, that selects the memory elements in said memory circuit cyclically and causes said memory elements to store said digital data when thus selected;
a read control circuit coupled to said second clock terminal and said memory circuit, for generating a read control signal, synchronized with said second clock signal, that selects the memory elements in said memory circuit cyclically and causes said memory elements to output the digital data stored therein when thus selected, and for adjusting said read control signal in phase responsive to a phase adjustment signal; and
a phase comparator coupled to said write control circuit and said read control circuit, for comparing said write control signal and said read control signal, and generating said phase adjustment signal; wherein said phase adjustment signal causes said read control circuit to adjust said read control signal by different phase amounts responsive to different phase relations between said write control signal and said read control signal.

2. The bit synchronization circuit of claim 1, wherein said memory is coupled to said first clock terminal and stores said digital data in synchronization with first clock signal.

3. The bit synchronization circuit of claim 1, wherein said phase comparator establishes a predetermined access conflict area, and generates said phase adjustment signal when said phase relation falls within said access conflict area.

4. The bit synchronization circuit of claim 1, wherein said memory circuit has two said memory elements, which are selected alternately by said write control signal.

5. The bit synchronization circuit of claim 1, wherein said digital data are input as parallel data and output from said data output terminal as serial data.

6. The bit synchronization circuit of claim 5, wherein said memory circuit has two said memory elements per parallel bit of said digital data.

7. A method of synchronizing digital data, received in synchronization with a first clock signal, to a second clock signal having a frequency which is N times said first frequency, wherein N is an integer greater than unity, comprising the steps of:
generating from said first clock signal a write control signal that cyclically selects memory elements in a memory circuit;
storing said digital data in the memory elements selected by said write control signal;
generating from said second clock signal a read control signal that cyclically selects said memory elements;
outputting said digital data from the memory elements selected by said read control signal;
comparing said write control signal and said read control signal in phase; and
adjusting said read control signal in phase by different amounts responsive to different phase relations between said write control signal and said read control signal.

8. The method of claim 7, comprising the further step of supplying said first clock signal to said memory circuit, wherein said step of storing said digital data is synchronized to said first clock signal.

9. The method of claim 7, wherein said step of comparing comprises detecting whether said phase relation falls in a predetermined access conflict area.

10. The method of claim 7, wherein said digital data are received as serial data.

11. The method of claim 10, wherein said memory circuit has two memory elements, which are selected alternately by said write control signal.

12. The method of claim 7, wherein said digital data are received as K-bit parallel data, where K is an integer greater than unity.

13. The method of claim 12, wherein said memory circuit has a first set of K memory elements and a second set of K memory elements, and said write control signal selects said first set of K memory elements and said second set of K memory elements alternately.

14. The method of claim 13, wherein said digital data are output as serial data.

* * * * *